United States Patent [19]

Maekawa et al.

[11] Patent Number: 4,860,186
[45] Date of Patent: Aug. 22, 1989

[54] PWM CONTROLLER HAVING SYNCHRONOUS AND ASYNCHRONOUS MODE

[75] Inventors: Katsumi Maekawa, Tokorozawa; Tatsuaki Ambo, Tokyo, both of Japan

[73] Assignee: Kabushiki Kaisha Toshiba, Kawasaki, Japan

[21] Appl. No.: 268,567

[22] Filed: Nov. 8, 1988

[30] Foreign Application Priority Data

Nov. 12, 1987 [JP] Japan .................... 62-284217

[51] Int. Cl.$^4$ .......................................... H02M 7/529
[52] U.S. Cl. ...................................... 363/41; 318/811
[58] Field of Search .................. 363/41, 42; 318/803, 318/811

[56] References Cited

U.S. PATENT DOCUMENTS

| | | | |
|---|---|---|---|
| 4,099,109 | 7/1978 | Abbondanti | 363/42 |
| 4,615,000 | 9/1986 | Fujii et al. | 363/41 |
| 4,720,777 | 1/1988 | Yokoi | 318/811 |
| 4,779,183 | 10/1988 | Mutoh et al. | 363/41 |
| 4,802,077 | 1/1989 | Fujii et al. | 363/41 |

FOREIGN PATENT DOCUMENTS

| | | | |
|---|---|---|---|
| 60-14693 | 1/1985 | Japan | |
| 156271 | 8/1985 | Japan | 363/41 |
| 174088 | 9/1985 | Japan | 318/811 |

OTHER PUBLICATIONS

Abbondanti, "A Digital Modulator Circuit for PWM Inverters", IEE-IAS Conf. Paper, pp. 493-501, 1978 Meeting, Toronto Canada (Oct. 1-5, 1978).

Primary Examiner—William H. Beha, Jr.
Attorney, Agent, or Firm—Foley & Lardner, Schwartz, Jeffery, Schwaab, Mack, Blumenthal & Evans

[57] ABSTRACT

A PWM controller for a PWM inverter, in which a phase counter counts synchronous pulses having a frequency proportional to that of the inverter to a phase signal, and PWM pattern data is read out of a memory such as ROM by addressing using a pattern selection signal and the phase signal, in which a distributor distributes the PWM pattern data by upper bit of the phase signal to output PWM signals for controlling the inverter, and a modulation counter counts the synchronous pulses or asynchronous pulses selected by a mode signal to output a counted value to the memory, in which the counted value of the modulation counter is used instead of lower bit of the phase signal to selectively output the PWM signals of a synchronous or asynchronous PWM control.

8 Claims, 7 Drawing Sheets

PWM CONTROLLER HAVING SYNCHRONOUS AND ASYNCHRONOUS MODE

BACKGROUND OF THE INVENTION

1. Field of the Invention

The present invention relates to a PWM controller for an inverter, which forms PWM control signals for controlling a PWM inverter from PWM pattern data read out of a memory.

2. Description of the Prior Art

In a conventional controller for a pulse width modulation (PWM) inverter, the desired control pattern data is calculated and is stored in a memory in advance in off-line, and the control pattern data is read out of the memory according to an instruction in on-line to control the PWM inverter, as disclosed in the report "A Semiconductor Power Inversion Circuit" edited by the Professional Committee for the Semiconductor Power Inversion System Research in the Electric Society, Mar. 31, 1987. In this system, since the desired control pattern data is calculated in off-line, the controls such as the low-dimensional harmonic elimination PWM control, the torque ripple reduction control, the harmonic loss reduction control and the like, while it is difficult to perform such controls in another PWM control in on-line, can be readily carried out.

However, in the conventional PWM controller having a memory therein, only a synchronous type in which the PWM frequency is proportional to the inverter frequency, is used. When the operating frequency becomes low, the torque ripple increases, and there is a limitation in the minimum frequency. That is, the memory is addressed according to a voltage command $V^*$ and an electrical angle command $\theta^*$, and the PWM control signals corresponding to these two commands $V^*$ and $\theta^*$ are output. When the command $\theta^*$ is given by n bits, the $2^n$ number of commands $\theta^*(=\theta 0^*, \theta_1^*, \theta_2^*, \ldots, \theta_k^*, \ldots, \theta_{2n-2}^*, \theta_{2n-1}^*)$ are available. When the frequency is lowered, the staying time of the signal in $\theta_k^*$ ($k \approx 0_1$ to $2^n - 1$) becomes long, that is, since the phase resolution is constant irrespective of the operating frequency, as the operating frequency is lowered, the resolution per one unit time reduced. Hence, the current and the torque ripple increase, and it becomes impossible to conduct the operation due to the overcurrent below a certain frequency determined by the capacity of the memory, which restricts its applications.

It is desirable that the operating frequency is wide in an inverter widely used in engineering machines, and the asynchronous PWM control should be used in the low speed range. However, providing the two controller, i.e., the PWM controller using the memory and the asynchronous PWM controller brings about the cost increase.

SUMMARY OF THE INVENTION

Accordingly, it is an object of the present invention to provide a PWM controller for a PWM inverter, free from the aforementioned defects and inconveniences of the prior art, which is capable of performing both synchronous and asynchronous PWM controls using a memory in a wide range of operating frequencies.

In accordance with one aspect of the invention, there is provided a PWM controller, comprising phase counter means for counting synchronous pulses having a proportional frequency to that of an inverter to be controlled to output a phase signal, memory means for storing at least two PWM pattern data with addresses, the PWM pattern data being read out by addressing using a pattern selection signal and the phase signal, distributor means for distributing the PWM pattern data read out of the memory means using upper bit of the phase signal to output PWM signals for controlling the inverter, and modulation counter means for counting one of the synchronous pulses and asynchronous pulses having a certain frequency to output a counted value to the memory means, the one of the synchronous and asynchronous pulses being selected according to a mode signal, the counted value of the modulation counter means being used instead of lower bit of the phase signal to selectively output the PWM signals of one of synchronous and asynchronous PWM controls.

BRIEF DESCRIPTION OF THE DRAWINGS

Above and other objects, features and advantages of the present invention will more fully appear from the following description of the preferred embodiments thereof with reference to the accompanying drawings, in which.

DESCRIPTION OF THE PREFERRED EMBODIMENTS

Figure 1:
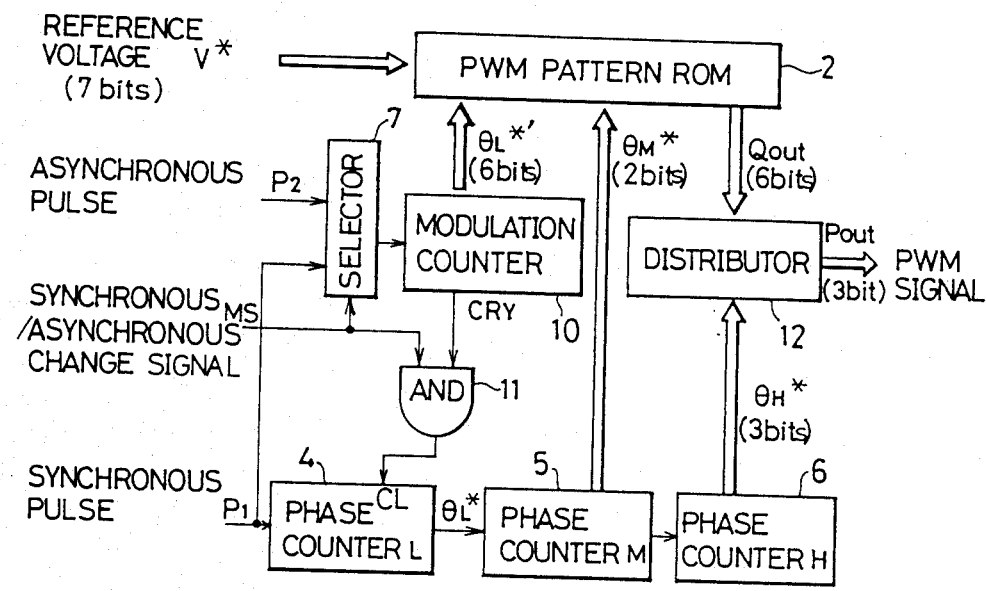
FIG. 1 is a block diagram of a first embodiment of a PWM controller according to the present invention.

Referring now to the drawings, wherein like reference characters designate like or corresponding parts throughout the several views, there is shown in FIG. 1 a first embodiment of a PWM controller according to the present invention.

In the drawing, a plurality of PWM pattern data is stored in or read out of a PWM pattern ROM 2, and a reference voltage $V^*$ is input to the ROM 2 as a pattern selecting signal to address a PWM pattern address area of a certain voltage. First, second and third phase counters 4, 5 and 6 for lower, intermediate and higher bits are connected in cascade and count numbers of synchronous pulses $P_1$ to output phase signals or counted values $\theta_L^*$, $\theta_M^*$ and $\theta_H^*$, respectively, and by using the counted values of the synchronous pulses $P_1$, a plurality of PWM pattern data is read out of the ROM 2 and, in the same time, the PWM pattern data having the predetermined electrical angle is addressed. In this embodiment, a pulse signal having a frequency proportional to an operating frequency of an inverter to which the PWM controller of the present invention is applied, is given as the synchronous pulse $P_1$ to the first phase counter 4, as hereinafter described in detail.

In this embodiment, for instance, the reference voltage $V^*$ and the counted values $\theta_L^*$, $\theta_M^*$ and $\theta_H^*$ of the first, second and third phase counters 4, 5 and 6 for are represented by 7 bits, 6 bits, 2 bits and 3 bits, respectively.

The phase counter 6 is a hexadic counter to output six values $\theta_H^*$ such as 0 to 5. The other counters 4 and 5 fully count within the bit numbers to output 64 values $\theta_L^*$ such as 0 to 63 and four values $\theta_M^*$ such as 0 to 3, respectively. Clock pulses having a certain frequency for use in an asynchronous PWM control hereinafter described are fed as asynchronous pulse $P_2$ into a selector 7 along with the synchronous pulses $P_1$, and the selector 7 selects the synchronous pulses $P_1$ or the asynchronous pulses $P_2$ according to a synchronous/asynchronous change signal MS as a mode signal to be fed to the selector 7 and outputs the selected pulses $P_1$ and $P_2$ to a modulation counter 10. The modulation counter 10 counts the number of the pulses $P_1$ or $P_2$ and sends the counted value $\theta_L^{*'}$ of 6 bits to the ROM 2. The bit number 6 of the counted value $\theta_L^{*'}$ of the modulation counter 10 is the same as that of the first phase counter 4. The mode signal MS is supplied to an AND circuit 11 where, when the mode signal MS selects the synchronous pulse $P_1$, its gate is opened to pass a carry CRY of the modulation counter 10 to the first phase counter 4, and the carry CRY clears the count number to naught in the first phase counter 4. The second phase counter 5 outputs the counted value $\theta_M^*$ to the ROM 2.

The ROM 2 is addressed by the code of 15 bits, i.e., the reference voltage $V^*$, the counted value $\theta_L^{*'}$ of the modulation counter 10 and the counted value $\theta_M^*$ of the second phase counter 5 to output the stored PWM pattern data as signals $Q_{out}$ of 6 bits to a distributor 12. For information, a device interchangeable with PROMi-27256 (Trade Name) of INTER CORPORATION is provided with an 8-bit data line, and its 6 bits may be used for the ROM 2.

The 6-bit PWM data $Q_{out}$ is fed from the ROM 2 to a distributor 12, and the distributor 12 selects 3-bit data from the 6-bit PWM data $Q_{out}$ and outputs the selected 3-bit PWM pattern data as PWM control signals $P_{out}$ for three phases of a three-phase inverter. The 3-bit counted value $\theta_H^*$ is also input from the third phase counter 6 to the distributor 12 for instructing the above data distribution operation.

The 6-bit PWM data $Q_{out}$ output simultaneously from the ROM 2 includes 6 data having a period of 60° and a phase difference of 60° which is obtained by dividing one period of its periodic function into six equal parts.

Assuming that the periodic function is represented by a sine wave, the PWM data will be described in connection with FIG. 2.

FIG. 2a illustrates a sine wave $e_1$ having an amplitude $V^*$ and a triangular wave $e_2$ having a constant amplitude, and FIG. 2b shows a PWM signal obtained by comparing these two signals $e_1$ and $e_2$. The frequency of the triangular wave $e_2$ is set to 24 times of the frequency of the sine wave $e_1$, and this 24 number is determined by, e.g., $6 \times 4 = 24$, wherein 6 stands on 6 bits of the output data $Q_{out}$ of the ROM 2, and 4 means the quaternary of 2 bits of the second phase counter 5. The frequency of the triangular wave $e_2$ may be determined to integral times, e.g., twice, three times or four times of 24.

Concerning the logical values of the PWM signal shown in FIG. 2b, the sine wave PWM signal having the amplitude $V^*$ is obtained by setting continuity periods of positive and negative side elements of an inverter bridge to "1" and "0", respectively.

One cycle of the sine wave PWM signal shown in FIG. 2b is divided into six equal parts by the period of 60°, and thus is stored as six PWM pattern data having periods 0°-60°, 60°-120°, 120°-180°, 180°-240°, 240°-300° and 300°-360° in 0-bit, 1-bit, 2-bit, 3-bit, 4-bit and 5-bit of the ROM 2. Accordingly, the six PWM pattern data having the phase difference 60° from one another are simultaneously and repeatedly read out of the ROM 2 by the counted value $\theta_L^{*'}$ of the first phase counter 4 and the counted value $\theta_M^*$ of the second phase counter 5, and the distributor 12 changes consecutively the bits every 60° period by the counted value $\theta_H^*$ of the third phase counter 6 to output one cycle of the PWM pattern data as the PWM control signals $P_{out}$.

The PWM pattern data of FIG. 2b is obtained by continuously changing 0-bit, 1-bit, 2-bit, 3-bit, 4-bit and 5-bit of the ROM 2 using the counted value $\theta_H^*$ of the third phase counter 6. In this embodiment, since the frequency of the triangular wave $e_2$ is determined to 24 times of that of the sine wave $e_1$, the period of the counted value $\theta_L^*$ of the first phase counter 4 is equal to that of the triangular wave $e_2$.

Then, the operation of the synchronous PWM control according to the present invention will now be described in connection with FIG. 3.

Figure 2:
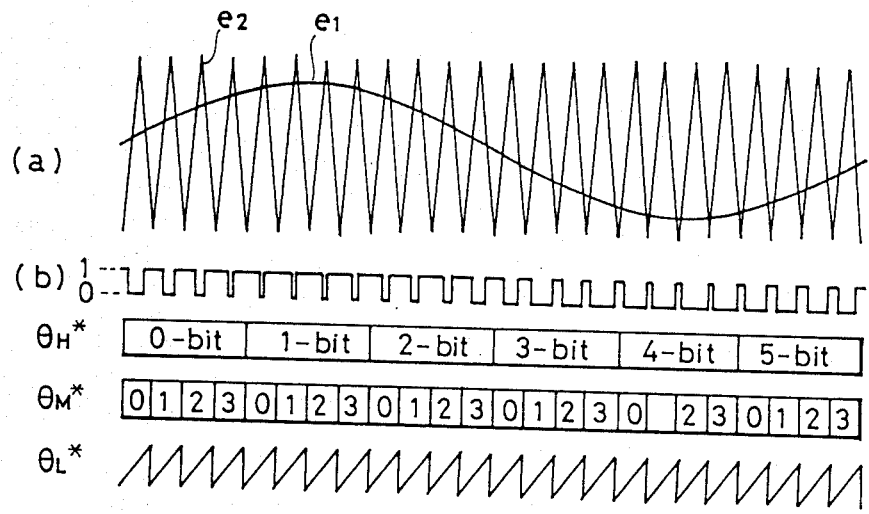
FIG. 2 shows wave forms of signals for preparing a PWM signal for use in both synchronous and asynchronous PWM controls according to the present invention.
Figure 3:
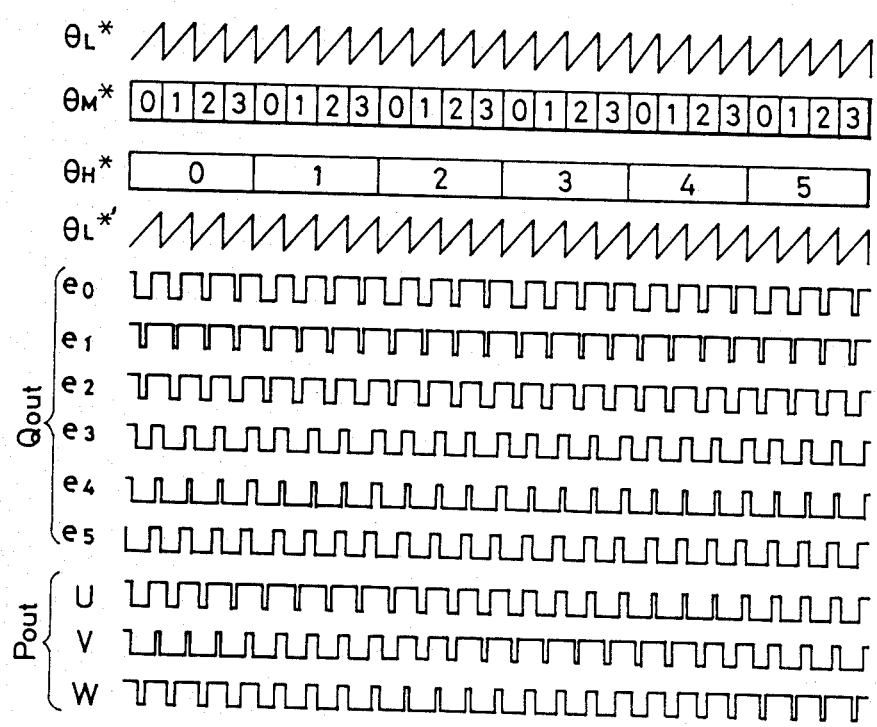
FIG. 3 shows wave forms of signals for conducting the operation of the synchronous PWM control in the PWM controller of FIG. 1.

The first, second and third phase counters always count the synchronous pulses $P_1$, and the relation among their counted values $\theta_L^*$, $\theta_M^*$ and $\theta_H^*$ is shown in FIG. 3. In the synchronous PWM control, the synchronous/asynchronous change signal MS becomes "1", and the selector 7 selects the synchronous pulses $P_1$. Hence, the counted value $\theta_L^{*'}$ of the modulation counter 10 becomes equal to the counted value $\theta_L^*$ of the first phase counter 4. Even when the counted value $\theta_L^*$ temporarily becomes different from the counted value $\theta_L^{*'}$, the modulation counter 10 outputs the carry CRY to the AND circuit 11, and the first phase counter 4 is cleared by the carry CRY passing through the AND circuit 11. Then, the counted values of the first phase counter 4 and the modulation counter 10 are simultaneously cleared to naught by the next synchronous pulse $P_1$, and thereafter the counted values $\theta_L^*$ and $\theta_L^{*'}$ of the two counters 4 and 10 become equal. The ROM 2 outputs the 6-bit PWM pattern data $e_0$ to $e_5$ stored in the addresses addressed by the reference voltage $V^*$ and the counted values $\theta_M^*$ and $\theta_L^{*'}$ of the modulation counter 10 and the second phase counter 5, as the $Q_{out}$ signal to the distributor 12. As the counted value $\theta_H^*$ of the third phase counter 6 varies every one cycle such as $0 \rightarrow 1 \rightarrow 2 \rightarrow 3 \rightarrow 4 \rightarrow 5 \rightarrow 0$, the distributor 12 changes the 3-bit PWM control signal $P_{out}$ so as to selectively output the PWM data, e.g., $e_0 \rightarrow e_1 \rightarrow e_2 \rightarrow e_3 \rightarrow e_4 \rightarrow e_5 \rightarrow e_0$ for U-phase, $e_4 \rightarrow e_5 \rightarrow e_0 \rightarrow e_1 \rightarrow e_2 \rightarrow e_3 \rightarrow e_4$ for V-phase or $e_2 \rightarrow e_3 \rightarrow e_4 \rightarrow e_5 \rightarrow e_0 \rightarrow e_1 \rightarrow e_2$ for W-phase. The output data $P_{out}$ for the U-, V- and W-phases have the same wave form as the PWM pattern data shown in FIG. 2b, except their phase differences of 120°, and thus may be used symmetrical three phase PWM signals.

Then, the operation of the asynchronous PWM control according to the present invention will be described with reference to FIG. 4.

In this case, the synchronous/asynchronous change signal MS is set to "0", and the selector 7 selects the asynchronous pulses $P_2$. Thus, the counted value $\theta_L^{*\prime}$ of the modulation counter 10 is advanced by the asynchronous pulses $P_2$, and the counted values $\theta_L^*$, $\theta_M^*$ and $\theta_H^*$ of the first, second and third phase counters 4, 5 and 6 are forwarded by the synchronous pulses $P_1$. Further, since the synchronous/asynchronous change signal MS becomes "0", even when the modulation counter 10 outputs the carry CRY, the first phase counter 4 is not cleared. That is, in this embodiment, the modulation counter 10 is completely isolated in operation from the first, second and third phase counters 4, 5 and 6.

Figure 4:
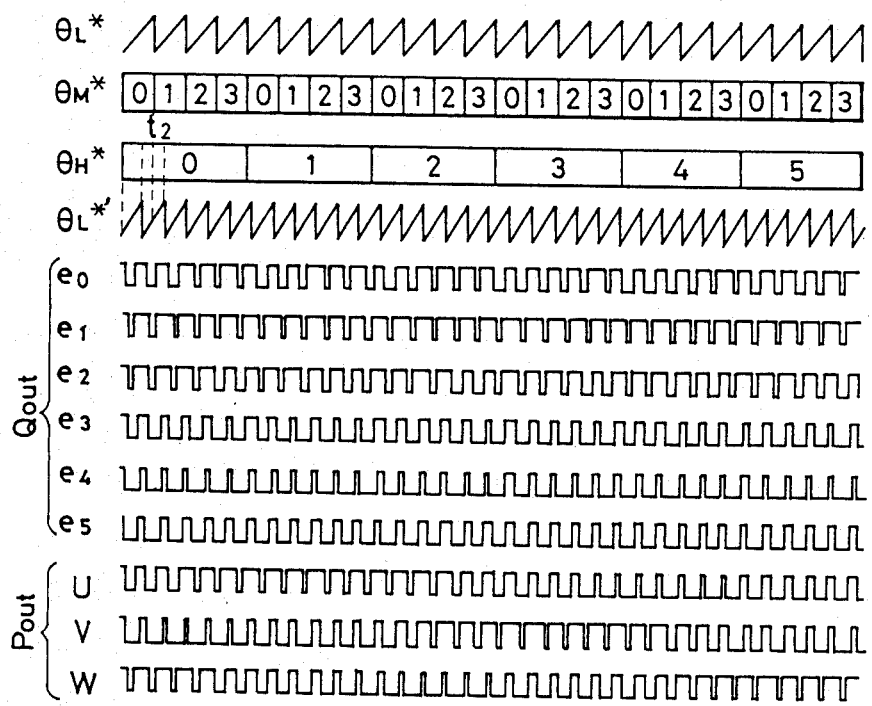
FIG. 4 shows wave forms of signals for conducting the operation of the asnynchronous PWM control in the PWM controller of FIG. 1.

In FIG. 4, the frequency $f_2$ of the asynchronous pulses $P_2$ is determined to approximately 1.4 times of the frequency $f_1$ of the synchronous pulses $P_1$. Accordingly, in this case, one period or cycle ($t_0$ to $t_1$) of the counted value $\theta_L^{*\prime}$ of the modulation counter 10 is 1/1.4 (approximately 70%) of one cycle ($t_0$ to $t_2$) of the counted value $\theta_L^*$ of the first phase counter 4. Hence, as to the output pattern data $Q_{out}$ of the ROM 2, the phase width is compressed to approximately 70% in comparison with the one shown in FIG. 3. The counted value $\theta_L^{*\prime}$ of the modulation counter 10 is reset to "0" at the time $t_1$, and the modulation counter 10 starts again to count the pulses. However, while the counted value $\theta_M^*$ of the second phase counter 5 is not changed in the period ($t_1$ to $t_2$), the pattern data is output again from the ROM 2 in the period ($t_0$ to $t_1$).

Now, when $f_2/f_1$ is defined to n, the pattern data in the period ($t_0$ to $t_1$) is repeatedly output n times. Since $f_2/f_1$ is 1.4 in the embodiment of FIG. 4, the pattern data in the period ($t_1$ to $t_2$) corresponding to the former 40% of the pattern data in the period ($t_0$ to $t_1$) is output.

The counted value $\theta_L^*$ of the first phase counter 4 for counting the number of the synchronous pulses $P_1$ overflows at a time $t_2$ to advance the counted value $\theta_M^*$ of the second phase counter 5 from "0" to "1" while the modulation counter 10 independently continues counting of the asynchronous pulses $P_2$.

Accordingly, the pattern data output from the ROM 2 in the period ($t_2$ to $t_3$) corresponds to approximately the latter 60% of the pattern data shown in FIG. 3, which is output from the ROM 2 during the period of $0_H^*=0$ to $0_M^*=1$ in the synchronous PWM mode, while the phase width of the output pattern data is compressed to approximately 70% of the pattern data of FIG. 3 in the same time, like the data $e_0$ to $e_5$ shown in FIG. 4.

As described above, in FIG. 4, the pattern data $e_0$ to $e_5$ output from the ROM 2 in the period ($t_1$ to $t_3$) becomes a combination of the pattern data of FIG. 3 during the period $\theta_H^*32\ 0$ to $\theta_M^*=0$ and the pattern data of FIG. 3 during the period $\theta_H^*=0$ to $0_M^*=1$ at the ratio of approximately 4:6, and the phase widths of the pattern data $e_0$ to $e_5$ are compressed to approximately 70% of those shown in FIG. 3.

Then, the pattern data of $e_0$ to $e_5$ shown in FIG. 4 is read out of the ROM 2 in the same manner as described above, and the distributor 12 outputs the 3-phase PWM signals $P_{out}$ for the U-, V- and W-phases by the counted value $\theta_H^*$ of the third phase counter 6 in the same manner as the synchronous PWM mode described above. As shown in FIG. 4, the PWM signals each include one pulse having a different width therefrom per one cycle of the counted value $\theta_L^{*\prime}$ of the modulation counter 10, and act as the asynchronous PWM control signals whose pulse width modulation frequencies can be determined by the frequency $f_2$ of the asynchronous pulses $P_2$.

As described above, the synchronous PWM control and the asynchronous PWM control are changed by setting the synchronous/asynchronous change signal MS to "1" or "0", and the PWM pattern data to be stored in the ROM 2 must be synchronous/asynchronous common-use pattern data including an integral number of pulses per one cycle of the counted values $\theta_M^*$ of the second phase counter 5, as shown in FIG. 2, so as not to generate an excessive and irregular pulse having a narrow width in the asynchronous PWM control. However, in a high voltage and high frequency region where only the synchronous PWM control is conducted, various PWM pattern data may be stored at will in the ROM 2. Hence, the synchronous/asynchronous common-use pattern data may be used only in the asynchronous PWM control region.

Even when the counted value $\theta_L^{*\prime}$ of the modulation counter 10 is different from the counted value $\theta_L^*$ of the first phase counter 4 on changing from the asynchronous PWM control to the synchronous PWM control, as soon as outputting the carry CRY from the modulation counter 10, the first phase counter 4 is cleared by the next synchronous pulse $P_1$, resulting in that the counted value $\theta_L^*$ of the first phase counter 4 becomes equal to the counted value $\theta_L^{*\prime}$ of the modulation counter 10. That is, the first phase counter 4 is cleared by the synchronous pulse $P_1$ only after the outputting of the one pulse is finished, and therefore no irregular pulse is produced when the asynchronous PWM control is changed to the synchronous PWM control. Further, at this asynchronous to synchronous change time, the voltage phase of at most one cycle of the first phase counter 4 is jumped.

Although one cycle of the first phase counter 4 is determined to 15° in this embodiment, when the bit number of the first phase counter 4 and the modulation counter 10 is reduced in order to decrease one cycle, for example, to 7.5 or 3.75 while the bit number of the second phase counter 5 is enlarged, the jumped amount on changing the asynchronous PWM control to the synchronous PWM control is reduced to obtain a smooth change operation. Further, although the PWM pattern data of one cycle of the sine wave is entirely stored in the ROM 2 in this embodiment, by utilizing the symmetrical nature of the wave forms, only one fourth period (0° to 90°) of the PWM pattern data may be stored in the ROM 2, and the PWM pattern data may be repeatedly read out of the ROM 2 to produce one cycle of the PWM pattern data.

In this embodiment, the change from the synchronous PWM control to the asynchronous PWM control can be readily and smoothly carried out without any trouble because the counted values of the first phase counter 4 and the modulation counter 10 are equal at the changing moment.

Now, the generation of the irregular pulse in the asynchronous PWM control will be described.

Figure 5:
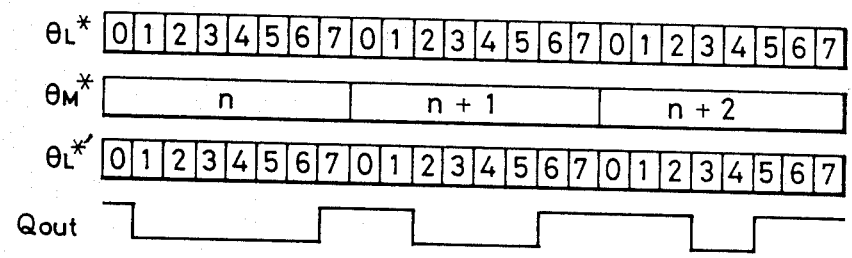
FIGS. 5 and 6 show output signals of a memory for explaining generation of irregular pulses in the asynchronous PWM control in the PWM controller of FIG. 1.
Figure 6:
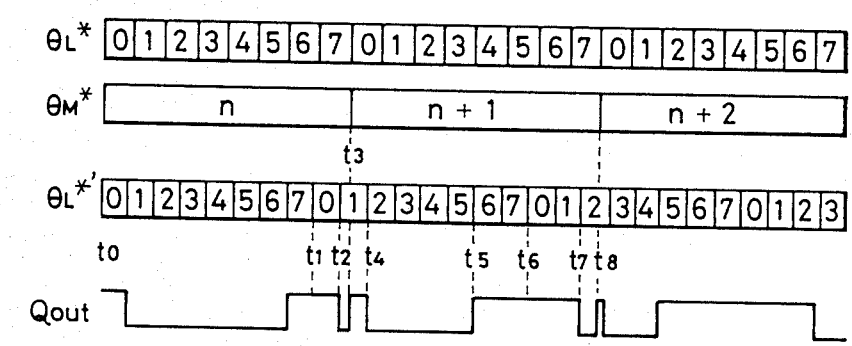

FIG. 5 shows a PWM pattern signal $Q_{out}$ output from the ROM 2 in the synchronous PWM control and FIG. 6 shows another PWM pattern signal $Q_{out}$ having irregular pulses therein in the asynchronous PWM control with respect to the counted values $\theta_L^*$, $\theta_M^*$ and $\theta_L^{*\prime}$ of the first and second phase counter 4 and 5 and the modulation counter 10, in which the first phase counter 4 and the modulation counter 10 are assumed to be 3 bits for the brevity of the description.

In the synchronous PWM control, as shown in FIG. 5, the counted value $\theta_L^{*\prime}$ of the modulation counter 10 becomes equal to the counted value $\theta_L^*$ of the first phase counter 4, and the PWM pattern data stored in the ROM 2 is read out of the ROM 2 as the output PWM pattern data $Q_{out}$ as it is. In the asynchronous PWM control, in turn, as shown in FIG. 6, the frequency $f_2$ of the asynchronous pulse $P_2$ is somewhat higher than that $f_1$ of the synchronous pulse $P_1$, and the counted value $\theta_L^{*\prime}$ of the modulation counter 10 is counted somewhat faster than that $\theta_L^*$ of the first phase counter 4.

That is, the modulation counter 10 counts up the full count in the period ($t_0$ to $t_1$) and one cycle of the PWM pattern data corresponding to the PWM pattern data during the time of the counted value $\theta_M^* = n$ in FIG. 5 is output from the ROM 2, and the ROM 2 repeatedly sends out the same PWM pattern data until the counted value $\theta_M^*$ of the second phase counter 5 becomes $n+1$ at the time $t_3$. Accordingly, the output $Q_{out}$ of the ROM 2 becomes "0" at the time $t_2$ when the counted value $\theta_L^{*\prime}$ of the modulation counter 10 becomes "1". When the counted value $\theta_M^*$ of the second phase counter 5 is changed to $n+1$ at the time $t_3$, the ROM 2 outputs a next cycle of PWM pattern data from the phase of the counted value $\theta_L^{*\prime} = 1$, and the output $Q_{out}$ of the ROM 2 becomes "1". Then, the ROM 2 repeatedly outputs a second cycle of PWM pattern data corresponding to the PWM pattern data during the time of the counted value $\theta_M^* = n+1$ in FIG. 5, according to the counted value $\theta_L^{*\prime}$ of the modulation counter 10 in the period ($t_3$ to $t_8$). Hence, the output $Q_{out}$ of the ROM 2 changes, such as "0" at the time $t_4$ when the counted value $\theta_L^{*\prime}$ of the modulation counter 10 becomes "2", "1" at the time $t_5$ when the counted value $\theta_L^{*\prime}$ is "6", and "0" at the time $t_7$ when the counted value $\theta_L^{*\prime}$ is "2". Then, the PWM pattern data is output from the ROM 2 according to the asynchronous pulses $P_2$ in the same manner as described above.

The asynchronous PWM pattern data having two pulses per one cycle of the modulation counter 10 in the period ($t_1$ to $t_6$), as shown in FIG. 6, has an irregular pulse wave form with respect to that of FIG. 5. The duty factor of the asynchronous PWM pattern data $Q_{out}$ in the period ($t_1$ to $t_6$) of FIG. 6 is an intermediate between the duty factors of the synchronous PWM pattern data in the periods of $\theta_M = n$ and $\theta_M = n+1$ of FIG. 5, and is closer to the latter rather than the former, and the wave form of the asynchronous PWM pattern data in the period ($t_1$ to $t_6$) may be considered to be a right wave form. Therefore, when switching elements having excellent characteristics such as a very high operation speed and a very small loss are used, this asynchronous PWM pattern data may be used actually as it is.

However, in practice, as the operation speed of the switching elements increases, the modulation is usually performed at a higher frequency, and thus it is not desirable to increase the switching times more than a certain number of times by using the PWM pattern data shown in FIG. 6.

Figure 7:
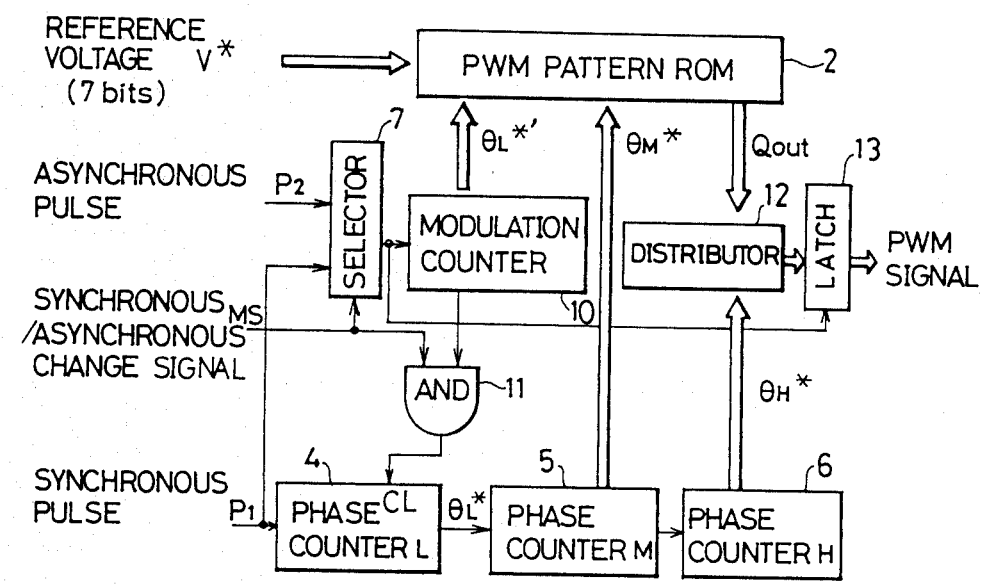
FIG. 7 is a block diagram of a second embodiment of a PWM controller according to the present invention.

In FIG. 7, there is shown a second embodiment of a PWM controller according to the present invention, which is capable of preventing the generation of the irregular pulses of the first embodiment described above.

In this embodiment, the PWM controller has the same construction as that of the first embodiment, except a latch circuit 13 for once latching the PWM control signals output from the distributor 12 in accordance with the pulse output from the selector 7. That is, in the asynchronous PWM control, when the output data $Q_{out}$ shown in FIG. 6 is output as the PWM signal from the distributor 12, the PWM pattern data which is the output data just before the counted value $\theta_L^{*\prime}$ of the modulation counter 10 is advanced by the asynchronous pulse $P_2$ and is latched in the latch circuit 13, is output therefrom. Hence, the "0" periods ($t_2$ to $t_3$) and ($t_7$ to $t_8$) of the output data $Q_{out}$ shown in FIG. 6 can be omitted. In this embodiment, however, such "0" period omissions can be made only when the difference between the leading and trailing addresses (the counted values $\theta_L^*$) of the PWM pattern data in the adjacent two counted values $\theta_M^*$ of the second phase counter 5, is "1" or "0", and, when the difference between the leading and trailing addresses is more than "1", the irregular pulses may be produced, as shown in FIG. 6. In the three-phase sine wave PWM pattern data, the output data may be continuously changed, and the bit numbers of the first and second phase counters 4 and 5 and the modulation counter 10 may be selected so as to satisfy the above described "0" period omission conditions.

Figure 8:
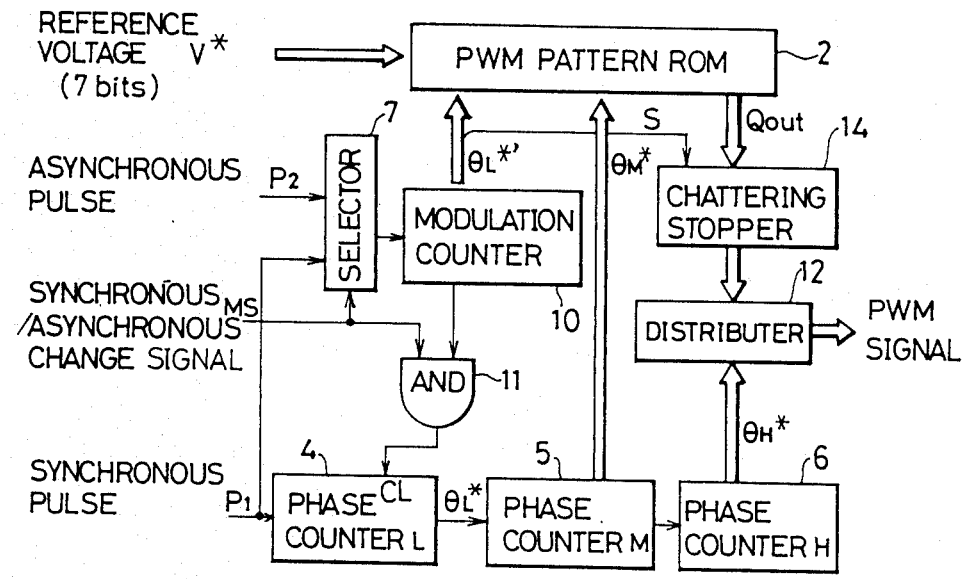
FIG. 8 is a block diagram of a third embodiment of a PWM controller according to the present invention.

In FIG. 8, there is shown a third embodiment of a PWM controller according to the present invention, which is capable of preventing the production of the irregular pulses of the first embodiment.

In this embodiment, a chattering stopper 14 for preventing the production of the irregular pulses is additionally provided between the ROM 2 and the distributor 12, as compared with the first embodiment. The chattering stopper 14 removes the irregular pulses in the PWM pattern data $Q_{out}$ output from the ROM 2 according to the uppermost bit S of the counted value $\theta_L^{*\prime}$ of the modulation counter 10. One embodiment of the chattering stopper 14 is shown in FIG. 9.

Figure 9:
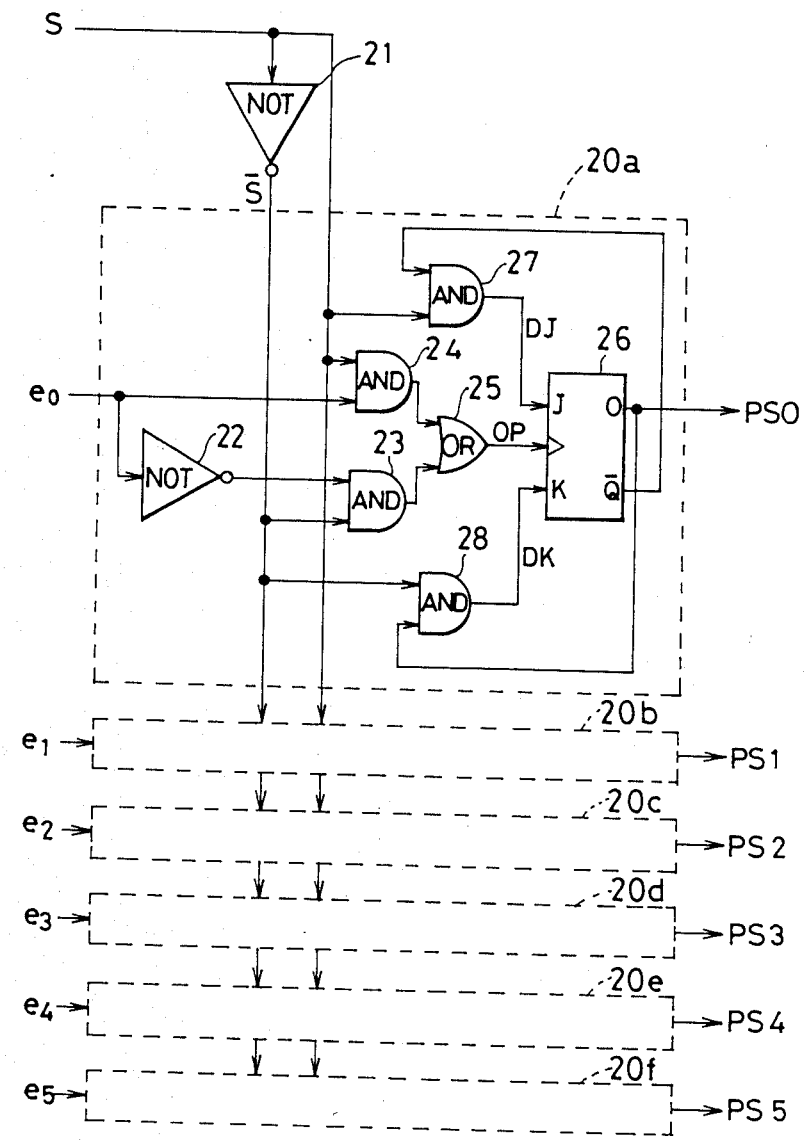
FIG. 9 is a block diagram of a chattering stopper of the third embodiment of the controller shown in FIG. 8.

In FIG. 9, the chattering stopper 14 includes six pulse reforming circuits 20a to 20f for one bit and a NOT circuit 21. Each of the pulse reforming circuits 20 to 20f having the same construction and functions includes a NOT circuit 22, four AND circuits 23, 24, 27 and 28, an OR circuit 25 and a flip-flop circuit 26. The pulse reforming circuits 20a to 20f reform the PWM pattern data $e_0$ to $e_5$, respectively, using the uppermost bit S of the counted value $\theta_L^{*\prime}$ of the modulation counter 10 to output reformed data PS0 to PS5, respectively, to the distributor 12. Thus, the operation of one of the pulse reforming circuits 20a to 20f will be described in detail in connection with FIG. 10.

Figure 10:
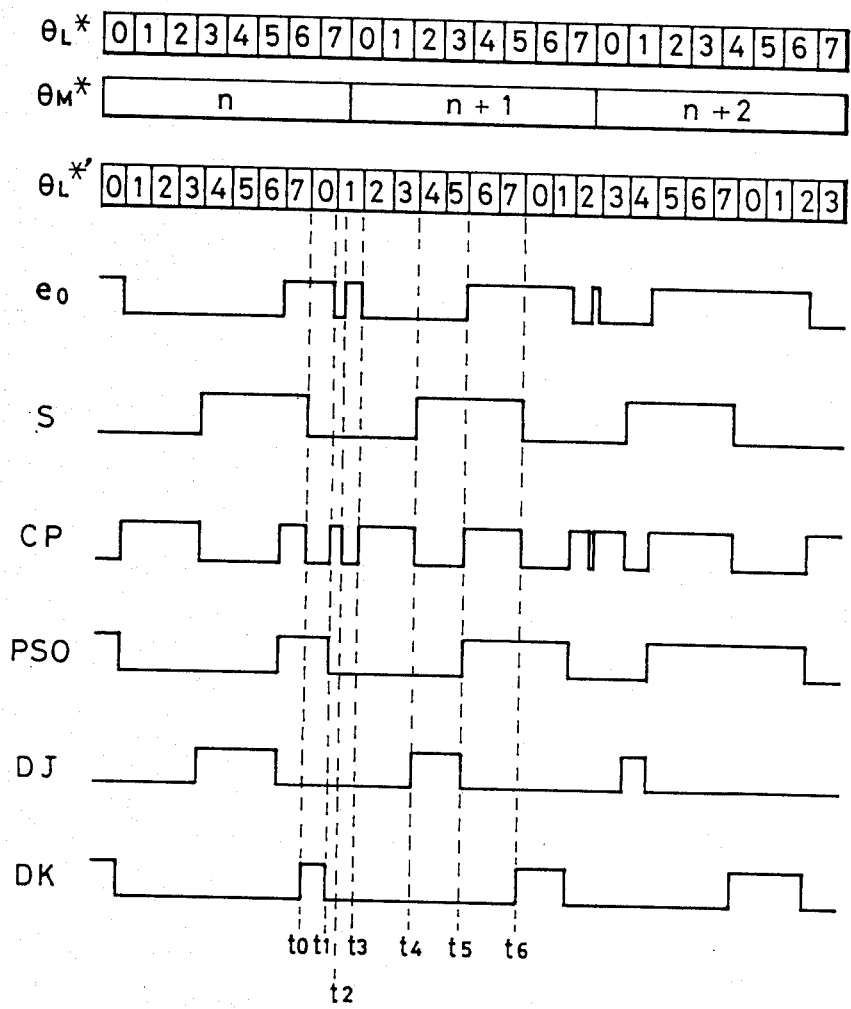
FIG. 10 shows wave forms of signals in the chattering stopper shown in FIG. 9.

In FIG. 10, one PWM pattern data $e_0$ including irregular pulses, output from the ROM 2, will be reformed to the data PS0 by using the uppermost bit S of the counted value $\theta_L^{*\prime}$ of the modulation counter 10, as follows. That is, the two signals $e_0$ and S are logically synthesized by the two NOT circuits 21 and 22, the two AND circuits 23 and 24 and one OR circuit 25 to obtain a signal CP, as shown in FIG. 10, which is fed as a clock signal to the flip-flop circuit 26. Logical products of the signals S and $\bar{S}$ and output signals $\bar{Q}$ and Q ($\overline{PS0}$ and PS0) of the flip-flop circuit 26 are input as signals DJ and DK to input terminals J and K of the flip-flop circuit 26 through the AND circuits 27 and 28.

Now, when the output signal PS0 of the flip-flop circuit 26 is "1" at the time $t_0$ and the uppermost bit S of the counted value $\theta_L^{*\prime}$ of the modulation counter 10 is "0", the input signals DJ and DK of the flip-flop circuit 26 become "0" and "1", respectively. The signals DJ and DK are input to the flip-flop circuit 26 when the clock signal CP is "0", and, when the clock signal CP then rises to "1" at the time $t_1$, the output signal PS0 is changed to "0". Then, the input signal DK is also changed to "0". In turn, since the signal S is still kept to "0", the input signal DJ is also "0". Therefore, since the input signals DJ and DK are "0", the flip-flop circuit 26 is in the restrained state and is not changed by the clock signal CP. Even when the clock signal CP is changed to "0" or "1" at the time $t_2$ or $t_3$, the output signal PS0 is not changed to be "0". Then, when the signal S becomes "1" at the time $t_4$, the input signal DJ of the flip-flop circuit 26 is changed to "1", and the output signal PS0 of the flip-flop circuit 26 may be changed to "1" by the clock signal CP. Hence, when the clock signal CP is changed from "0" to "1" at the time $t_5$, the output signal PS0 of the flip-flop circuit 26 is changed from "0" to "1". When the output signal PS0 of the flip-flop circuit 26 is changed to "1", the input signal DJ of the flip-flop circuit 26 is changed to "0" to change the flip-flop circuit 26 to the restrained state again. Then, when the signal S becomes "0" at the time $t_6$, the input signal DK is changed to "1", and the output signal PS0 of the flip-flop circuit 26 becomes "1" again in the same state as the time $t_0$ described above. The same operation as described above will be repeated.

As described above, the irregular pulses included in the signal $e_0$ output from the ROM 2 is removed in the pulse reforming circuit 20a, and the signal PS0 including only one pulse per one cycle of the modulation counter 10 is output from the pulse reforming circuit 20a, and the modulation frequency becomes constant. Further, the duty factor of the output signal PS0 of the pulse reforming circuit 20a becomes an intermediate value between those of the output signals of the ROM 2 when the counted values $\theta_M^*$ of the second phase counter 5 are n and n+1.

In this embodiment, the output signal PS0 is allowed once to change from "1" to "0" in the former half of one cycle of the modulation counter 10, and is also allowed once to change from "0" to "1" in the latter half of the one cycle of the modulation counter 10, thereby removing the irregular pulses, because the PWM pattern data stored in the ROM 2 changes "1"→0="1" in one cycle of the synchronous control, as shown in FIG. 2b. In turn, when the PWM pattern data is stored oppositely in the ROM 2 such as "0"→"1"→"0", the output signal PS0 may be allowed once to change from "0" to "1" in the former half of one cycle of the modulation counter 10 and also be allowed once change from "1" to "0" in the latter half of the one cycle of the modulation counter 10 in the pulse reforming circuits 20a to 20f.

In the third embodiment shown in FIG. 8, the limited conditions of the PWM pattern data in the second embodiment shown in FIG. 6 are unnecessary, and, even when the difference between the leading and trailing addresses of the PWM pattern data in the adjacent two counted values $\theta_M^*$ of the second phase counter 5 is more than one, the irregular pulses may be removed as described above. Accordingly, in addition to the three-phase sine wave PWM pattern data, the present invention may be applied to two-phase sine wave PWM pattern data (one phase is fixed to a certain positive or negative voltage and only the other two phases are controlled to control the voltages among the three phases to approximate sine waves). Although the chattering stopper 14 is positioned between the ROM 2 and the distributor 12 in the third embodiment, the chattering stopper 14 may be placed in the output side of the distributor 12 to output the PWM control pattern data, and, in this case, it requires only three pulse reforming circuits, which is economical and simple in construction.

In the above described preferred embodiments, the first phase counter 4 is cleared by the carry CRY of the modulation counter 10 in the synchronous PWM control in order to prevent the overcurrent since a pulse having a wider width than that in the normal operation when the synchronous PWM control is changed to the asynchronous PWM control. However, when the PWM control is conducted at more than 10 KHz using a quick switching elements such as FET devices, the current ripple is quite small, and hence the modulation counter 10 may be cleared by the carry CRY of the first phase counter 4 in the synchronous PWM control. In such a case, when the asynchronous PWM control is changed to the synchronous PWM control, the pulse having a wide width is produced, but its influence is very small. Further, there is no phase jump when the change between the synchronous and asynchronous PWM controls is carried out.

Further, when there is sufficient capacity in the ROM 2, both the synchronous PWM pattern data and the synchronous/asynchronous common use PWM pattern data may be stored in the ROM 2, and one of them may be selected by the synchronous/asynchronous change signal MS. In the synchronous PWM control, the modulation frequency of the PWM pattern data varies depending on the output frequency of the inverter. However, the modulation frequency does not vary in the asynchronous PWM control, and it may be advantageous to select the asynchronous PWM control in a certain voltage depending on noisy or other operational conditions. In these cases, the synchronous/asynchronous change can be carried out regardless of the reference voltage V*.

As described above, in the preferred embodiments of the present invention, when the value $\theta_L^{*\prime}$ of the modulation counter is counted by the frequency proportional to the operational frequency to obtain the same value as the lower bit $\theta_L^*$ of the first phase counter, the PWM pattern data read out of the memory becomes the pattern addressed by the intermediate and lower bits (electrical angles $\theta_M^* + \theta_L^*$) of the first and second phase counters, and this pattern data is distributed by the higher bit value $\theta_H^*$ of the third phase counter, thereby operating in the synchronous PWM control which is capable of outputting the optimum pattern data stored in the memory.

When the modulation counter is counted by a constant frequency, the frequency of the counted value $\theta_L^{*\prime}$ of the modulation counter becomes different from that of the lower bit value $\theta_L^*$ of the first phase counter. When the frequency for counting the modulation counter is high, the modulation counter is repeatedly counted in some cycles to repeatedly output the same value $\theta_L^{*\prime}$ during the time of the constant value $\theta_M^*$ to be fed to the memory. Hence, until one cycle of the lower bit value $\theta_L^*$ of the first phase counter is counted and the intermediate value $\theta_M^*$ of the second phase counter is changed, many pulses are output from the modulation counter, and their frequency is determined by the frequency for counting the modulation counter, i.e., to operate in the asynchronous PWM control.

Figure 11:
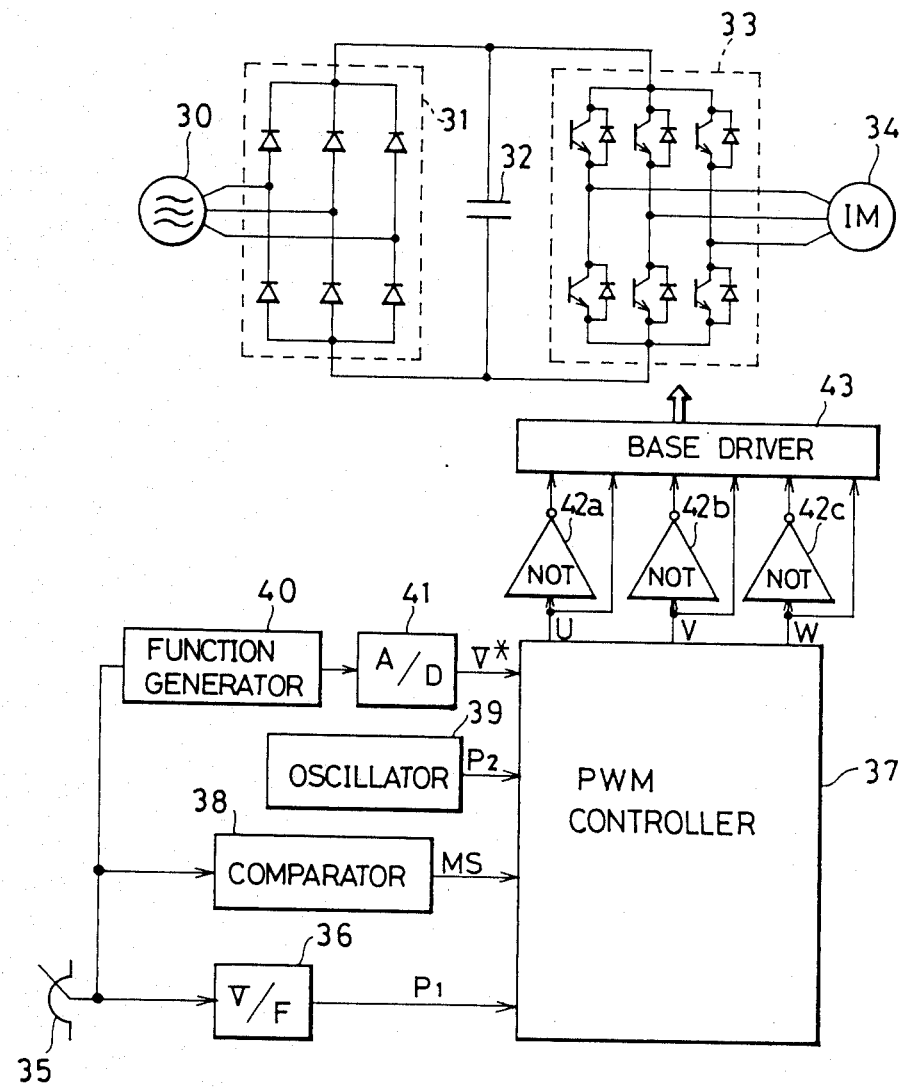
FIG. 11 is a schematic block diagram of a widely used inverter along with a PWM controller according to the present invention, which is applied thereto.

There is shown in FIG. 11 a widely used inverter along with a PWM controller according to the present invention, which is applied thereto. In FIG. 11, a three-phase commercial power source 30 is connected to a rectifier 31 for rectifying an alternating voltage into a direct voltage, and a capacitor 32 is coupled to the rectifier 31 in parallel therewith. An inverter 33 for converting a direct voltage into an alternating voltage is connected to the rectifier 31 and the capacitor 32 in parallel therewith, and a three-phase induction motor 34 is connected to the inverter 33.

A frequency setter 35 for setting up the fundamental frequency of the alternating voltage output by the inverter 33 is connected to a voltage-frequency (V/F) converter 36, a comparator 38 and a function generator 40. The V/F converter 36 outputs the synchronous pulses $P_1$ in proportion to the output voltage of the frequency setter 35 to the PWM controller 37 according to the present invention. When the output voltage of the frequency setter 35 is more than or at most a predetermined voltage, the comparator 38 outputs a logical value "1" or "0" as the synchronous/asynchronous change signal MS to the PWM controller 37, and an oscillator 39 generates a clock pulse having a certain frequency as the asynchronous pulse $P_2$ to the PWM controller 37. The function generator 40 outputs the reference voltage V* to the PWM controller 37 through an analog-digital (A/D) converter 41. The PWM controller 37 outputs the three-phase PWM control signals $P_{out}$ for the U-, V- and W-phases to a base driver 43 directly or via three NOT circuits 42a, 42b and 42c for the U-, V- and W-phases. The three-phase PWM control signals $P_{out}$ are amplified in the base driver 43, and the amplified PWM control signals are fed to the inverter 33 for driving the corresponding switching elements therein.

In this applied case, the PWM pattern data such as a synchronous/asynchronous common use pattern data for use in a low voltage region and a synchronous exclusive use pattern data of a low-dimensional harmonic elimination PWM control system for use in a high voltage region is stored in the ROM 2 within the PWM controller 37. When the output voltage of the frequency setter 35 is smaller than the comparison level of the comparator 38, the change signal MS selects the asynchronous pulses $P_2$, and the PWM controller 37 reads out the synchronous/asynchronous common use pattern data according to the asynchronous pulses $P_2$ output by the oscillator 39 to operate the inverter 33 in the asynchronous PWM control where the modulation frequency is constant. When the frequency setter 35 is controlled so that the output voltage of the frequency settler 35 is more than the comparison level of the comparator 38, the change signal MS selects the synchronous pulses $P_1$, and PWM controller 37 reads out the synchronous/asynchronous common use pattern data according to the synchronous pulses $P_1$ output by the V/F converter 36 to operate the inverter 33 in the synchronous PWM control, in which the modulation frequency is proportional to the operating frequency. Then, when the frequency setter 35 is controlled to further raise the output voltage, the ROM 2 outputs the synchronous pattern data of the low-dimensional harmonic elimination PWM control system to operate the inverter 33 in the synchronous PWM control of the low-dimensional harmonic elimination PWM control system.

Accordingly, by using a memory having a limited capacity, the inverter may be operated in the asynchronous PWM control corresponding to the triangular wave comparison in the low speed region, in the synchronous PWM control corresponding to the triangular wave comparison in the intermediate speed region or in the synchronous PWM control of the low-dimensional harmonic elimination control system in the high speed region. Hence, the inverter 33 can be operated in the optimum PWM control system depending on the frequency from the low speed region to the high speed region, and the low current ripple and the high efficient PWM control can be performed in the wide operational frequency range.

As described above, it is readily understood that according to the present invention it is possible to conduct an asynchronous PWM control by a PWM controller including a memory in which PWM pattern data is stored. Since a synchronous/asynchronous common use pattern data is prepared for the PWM pattern data corresponding to a triangular wave comparison, it is possible to conduct three PWM controls such as the asynchronous PWM control corresponding to the triangular wave comparison, the synchronous PWM control corresponding to the triangular wave comparison and the PWM control using the pattern data calculated in various conventional off-lines. Further, it is possible to carry out various PWM controls depending on the operational frequency and the output voltage, and the extension of the operational frequency range and the highly effective operation can be performed. Furthermore, the asynchronous PWM control can be conducted using the memory without providing a particular asynchronous PWM controller, the economical and widely used PWM controller can be provided.

Although the present invention has been described in its preferred embodiments with reference to the accompanying drawings, it is readily understood that the present invention is not limited to the preferred embodiments, and various changes and modification of the present invention may be made by a person skilled in the art without departing from the spirit and scope of the present invention.

What is claimed is:

1. A PWM controller, comprising:
   phase counter means for counting synchronous pulses having a proportional frequency to that of an inverter to be controlled to output a phase signal;
   memory means for storing at least two PWM pattern data with addresses, the PWM pattern data being read out by addressing using a pattern selection signal and the phase signal;
   distributor means for distributing the PWM pattern data read out of the memory means using upper bit of the phase signal to output PWM signals for controlling the inverter; and
   modulation counter means for counting one of the synchronous pulses and asynchronous pulses having a certain frequency to output a counted value to the memory means, the one of the synchronous and asynchronous pulses being selected according to a mode signal, the counted value of the modulation counter means being used instead of lower bit of the phase signal to selectively output the PWM signals of one of synchronous and asynchronous PWM controls.

2. The controller of claim 1, wherein the PWM pattern data includes one pulse in one cycle of the lower bit of the phase counter means, and the PWM signal includes at least one pulse in one cycle of the lower bit of the phase counter means.

3. The controller of claim 1, wherein, when the mode signal selects the synchronous pulses, a carry signal output by one of the modulation counter and the phase counter clears the counted value of the other of the modulation counter and the phase counter.

4. The controller of claim 1, wherein the phase counter means includes first, second and third phase counters for counting lower, intermediate and higher bits of the phase signal.

5. The controller of claim 1, wherein one of the synchronous and asynchronous pulses is selected according to the mode signal in a selector.

6. The controller of claim 1, wherein an AND circuit selectively passes the carry signal.

7. The controller of claim 1, also including latch means for latching one of the PWM pattern data read out of the memory means and the PWM signals output by the distributor means every one pulse to be fed to the modulation counter to prevent a production of at least one irregular pulse in the asynchronous PWM control.

8. The controller of claim 1, also including chattering stopper means for once latching one of leading and trailing of one of the PWM pattern data read out of the memory means and the PWM signals output by the distributor means in one of the former and latter half cycle of the modulation counter means to prevent a production of at least one irregular pulse in the asynchronous PWM control.

* * * * *